US012783894B2

(12) United States Patent
Gao et al.

(10) Patent No.: US 12,783,894 B2
(45) Date of Patent: Nov. 3, 2026

(54) CONTRASTIVE IN-CONTEXT LEARNING FOR LARGE LANGUAGE MODELS

(71) Applicant: INTUIT INC., Mountain View, CA (US)

(72) Inventors: Xiang Gao, Mountain View, CA (US); Kamalika Das, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 137 days.

(21) Appl. No.: 18/498,988

(22) Filed: Oct. 31, 2023

(65) Prior Publication Data

US 2025/0139445 A1 May 1, 2025

(51) Int. Cl.

| | |
|---|---|
| ***G06N 3/088*** | (2023.01) |
| ***G06F 40/40*** | (2020.01) |
| ***G06N 3/0455*** | (2023.01) |

(52) U.S. Cl.

CPC ............. *G06N 3/088* (2013.01); *G06F 40/40* (2020.01); *G06N 3/0455* (2023.01)

(58) Field of Classification Search

CPC ...... G06N 3/088; G06N 3/0455; G06F 40/40; G06F 40/35; G06F 40/56

See application file for complete search history.

(56) References Cited

U.S. PATENT DOCUMENTS

2005/0144090 A1* 6/2005 Gadamsetty ....... G06Q 30/0603 705/26.1
2006/0172275 A1* 8/2006 Cohen ...................... G09B 7/00 434/350
2014/0358631 A1* 12/2014 Ghose ................ G06Q 30/0201 705/7.29
2019/0122667 A1* 4/2019 Andersen ................ G06F 40/30
2023/0409615 A1* 12/2023 Khemka ................ G06V 20/68
2024/0095460 A1* 3/2024 Xu .......................... G06F 40/30
2024/0177462 A1* 5/2024 Ou .......................... G06F 18/00
2024/0256796 A1* 8/2024 Hyland ................... H04L 51/02
2025/0014373 A1* 1/2025 Menon .................. G06F 40/295

* cited by examiner

*Primary Examiner* — Michael N Opsasnick
(74) *Attorney, Agent, or Firm* — DLA PIPER LLP US

(57) ABSTRACT

A contrastive in-context learning protocol for large language models. The protocol includes inputting positive and negative examples to a large language model. Additionally, the large language model may be instructed to analyze the reasons behind the positive examples being positive and the negative examples being negative. The large language model with such contrastive in-context learning can generate specific responses/answers based on user preferences, generally not possible using conventional models.

18 Claims, 6 Drawing Sheets

300

200

300

400

410

CONTRASTIVE IN-CONTEXT LEARNING FOR LARGE LANGUAGE MODELS

BACKGROUND

Large language models powered by generative artificial intelligence have been in vogue recently. For example, OpenAIR's GPT-4 and ChatGPT have gained an enormous amount of traction and usage since their corresponding releases. Such large language models are trained using voluminous amounts of data publicly available on the Internet to generate human-like, comprehensive responses to input questions. These models provide technological improvements over conventional models that generate unnatural, robotic-sounding responses to user questions.

Despite the improvements, challenges remain. Large language models, by definition, are trained using a comprehensive training set of different types of text. Such a comprehensive training set overly genericizes the models—although these models have millions of optimized parameters to pull from a large knowledge base, they are not intended to be and will not be personalized. That is, these models cannot generate context-specific and/or user-specific responses. These models, comprehensive as they may be, cannot handle user preferences.

For example, a user may prefer shorter answers to his/her questions. Or, the user may want shorter answers for questions within a particular context (e.g., for questions relating to engineering) but longer answers for prompts in another context (e.g., for questions relating to medicine). Large language models cannot address these preferences, which is undesirable. Additionally, the user cannot explicitly enter preferences, e.g., the user cannot ask the models to "provide short answers to prompts within this context." This is also undesirable.

While there is some contextual learning in large language models, such learning is technologically inadequate. Large language models can learn some context for a session, e.g., a response to a prompt may be influenced by a previous response to a previous prompt. But the next session will have to start from scratch with no contextual learning transported from the previous sessions. This technological state is undesirable for applications where context-specific and/or user-specific responses are required.

As such, a significant improvement regarding in-context learning for large language models is desired.

SUMMARY

Embodiments disclosed herein solve the aforementioned technical problems and may provide other solutions as well. In one or more embodiments, contrastive in-context learning with both positive and negative examples is provided for a large language model. The combination of positive and negative examples provides the large language model with an indication of a user's preferences and/or any other type of customization the model should learn. That is, the model may learn to generate preferred responses and also learn not to generate the non-preferred responses. Models that have learned the in-context information using such contrastive examples can be deployed to different applications such as e.g., chatbots, e-mail generation, any kind of user-specific text generation, and/or the like.

In one or more embodiments, a computer-implemented method is provided. The method may comprise performing contrastive in-context learning on a large language model by: inputting to the large language model a question associated with a contrastive in-context learning protocol for the large language model, the contrastive in-context learning protocol being based on a user preference; inputting into the large language model a first answer for the question, the first answer forming a positive example of the contrastive in-context learning protocol; and inputting into the large language model a second answer for the question, the second answer forming a negative example of the contrastive in-context learning protocol. The method may also comprise deploying the large language model, after the contrastive in-context learning, to generate additional answers based on the user preference responsive to receiving additional questions.

In one or more embodiments, a system is provided. The system may comprise a non-transitory storage medium storing computer program instructions and a processor configured to execute the computer program instructions to cause operations. The operations may comprise performing contrastive in-context learning on a large language model by: inputting to the large language model a question associated with a contrastive in-context learning protocol for the large language model, the contrastive in-context learning protocol being based on a user preference; inputting into the large language model a first answer for the question, the first answer forming a positive example of the contrastive in-context learning protocol; and inputting into the large language model a second answer for the question, the second answer forming a negative example of the contrastive in-context learning protocol. The operations may also comprise deploying the large language model, after the contrastive in-context learning, to generate additional answers based on the user preference responsive to receiving additional questions.

DETAILED DESCRIPTION OF SEVERAL EMBODIMENTS

Embodiments disclosed herein provide a contrastive in-context learning protocol for large language models. In addition to inputting positive examples to a large language model, the protocol also includes inputting negative examples. Additionally, the large language model may be instructed to analyze the reasons behind the positive examples being positive and the negative examples being negative. The large language model with such contrastive in-context learning can generate specific responses/answers based on user preferences, generally not possible using conventional models.

Figure 1:
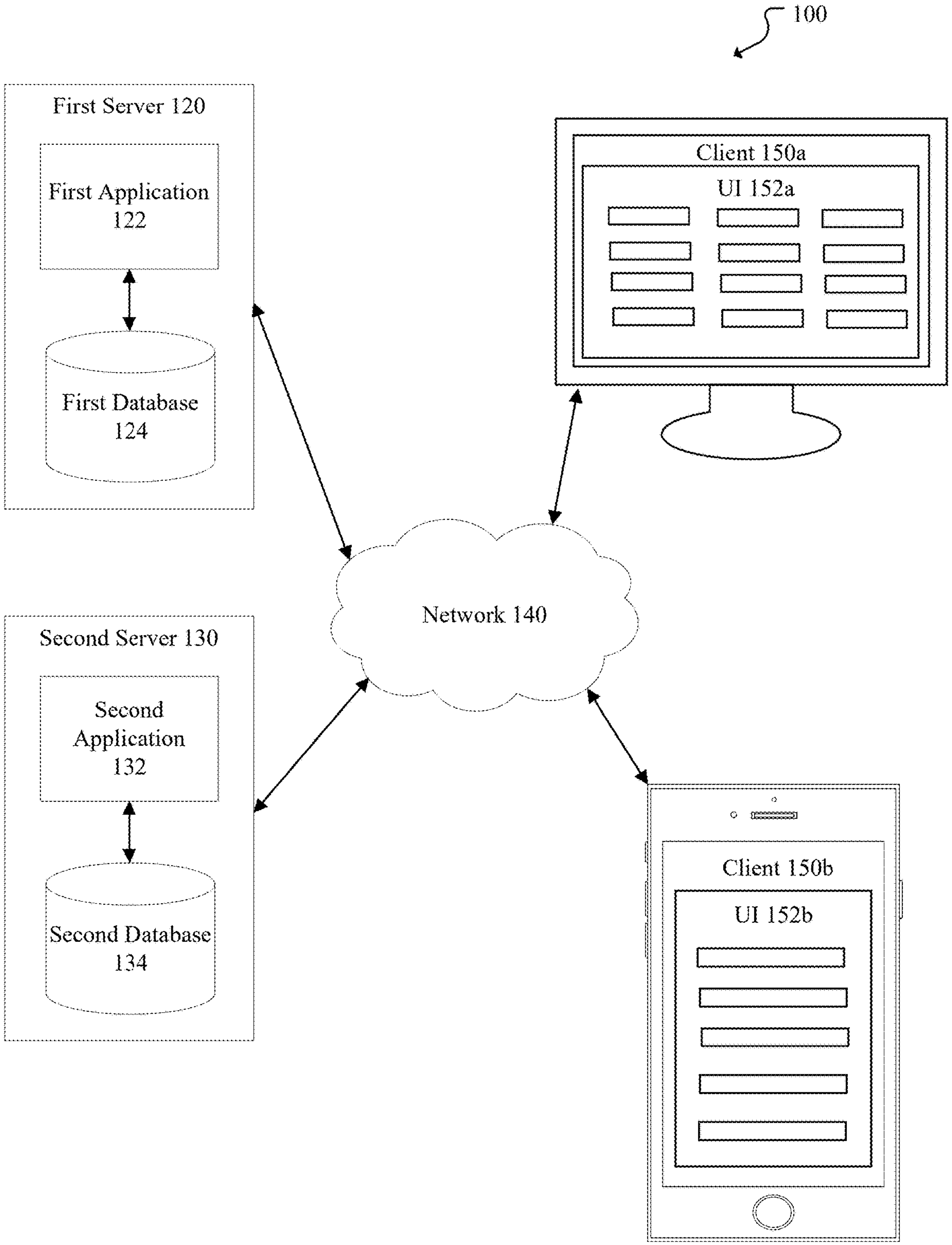
FIG. 1 shows an example of a system configured for contrastive in-context learning for large language models, based on the principles disclosed herein.

FIG. 1 shows an example of a system 100 configured for contrastive in-context learning for large language models, based on the principles disclosed herein. It should be understood that the components of the system 100 shown in FIG. 1 and described herein are merely examples and systems with additional, alternative, or fewer number of components should be considered within the scope of this disclosure.

As shown, the system 100 comprises client devices 150*a*, 150*b* (collectively referred to herein as "client devices 150"), and first and second servers 120, 130 interconnected by a network 140. The first server 120 hosts a first server application 122 and a first database 124 and the second server 130 hosts a second server application 132 and a second database 134. The client devices 150*a*, 150*b* have user interfaces 152*a*, 152*b*, respectively, (collectively referred to herein as "user interfaces (UIs) 152"), which may be used to communicate with the server applications 122, 132 via the network 140.

The server applications 122, 132 implement the various operations disclosed throughout this disclosure. For example, the server applications 122, 132 may input positive and negative examples to large language models. In one or more embodiments, each server application 122, 132 hosts a prompt writing module (e.g., prompt writing module described below in reference to FIG. 2) that inputs the prompt to large language models. The large language models may be stored in the corresponding databases 124, 134. Additionally, the positive and negative examples may be stored in the corresponding databases 124, 134.

Communication between the different components of the system 100 is facilitated by one or more application programming interfaces (APIs). APIs of system 100 may be proprietary and or may include such APIs as AWS APIs or the like. The network 140 may be the Internet and or other public or private networks or combinations thereof. The network 140 therefore should be understood to include any type of circuit switching network, packet switching network, or a combination thereof. Non-limiting examples of the network 140 may include a local area network (LAN), metropolitan area network (MAN), wide area network (WAN), and the like.

Client devices 150 may include any device configured to present user interfaces (UIs) 152 and receive user inputs, e.g., an admin user's instruction to perform contrastive in-context learning for the large language models. The UIs 152 are generally graphical user interfaces (GUIs). For example, the admin user may use the UIs 152 to provide different parameters for the contrastive in-context learning. The parameters may include, but are not limited to, a number of positive examples, a number of negative examples, whether the large language models should analyze the reason behind a positive example being positive and a negative example being negative, and/or any other type of parameter suitable for the models.

First server 120, second server 130, first database 124, second database 134, and client devices 150 are each depicted as single devices for ease of illustration, but those of ordinary skill in the art will appreciate that first server 120, second server 130, first database 124, second database 134, and or client devices 150 may be embodied in different forms for different implementations. For example, any or each of first server 120 and second server 130 may include a plurality of servers or one or more of the first database 124 and second database 134.

Alternatively, the operations performed by any or each of first server 120 and second server 130 may be performed on fewer (e.g., one) servers. In another example, a plurality of client devices 150 may communicate with first server 120 and or second server 130. A single user may have multiple client devices 150, and or there may be multiple users each having their own client devices 150.

Furthermore, it should be understood that the illustrated applications 122, 132 running on the servers 120, 130, and the databases 124, 134 being hosted by the servers 120, 130 are examples for carrying out the disclosed principles, and should not be considered limiting. Different portions of the server applications 122, 132 and, in one or more embodiments, the entirety of the server applications 122, 132 can be stored in the client devices 150. Similarly, different portions or even the entirety of the databases 124, 134 can be stored in the client devices 150. Therefore, the functionality described throughout this disclosure can be implemented at any portion of the system 100.

Figure 2:
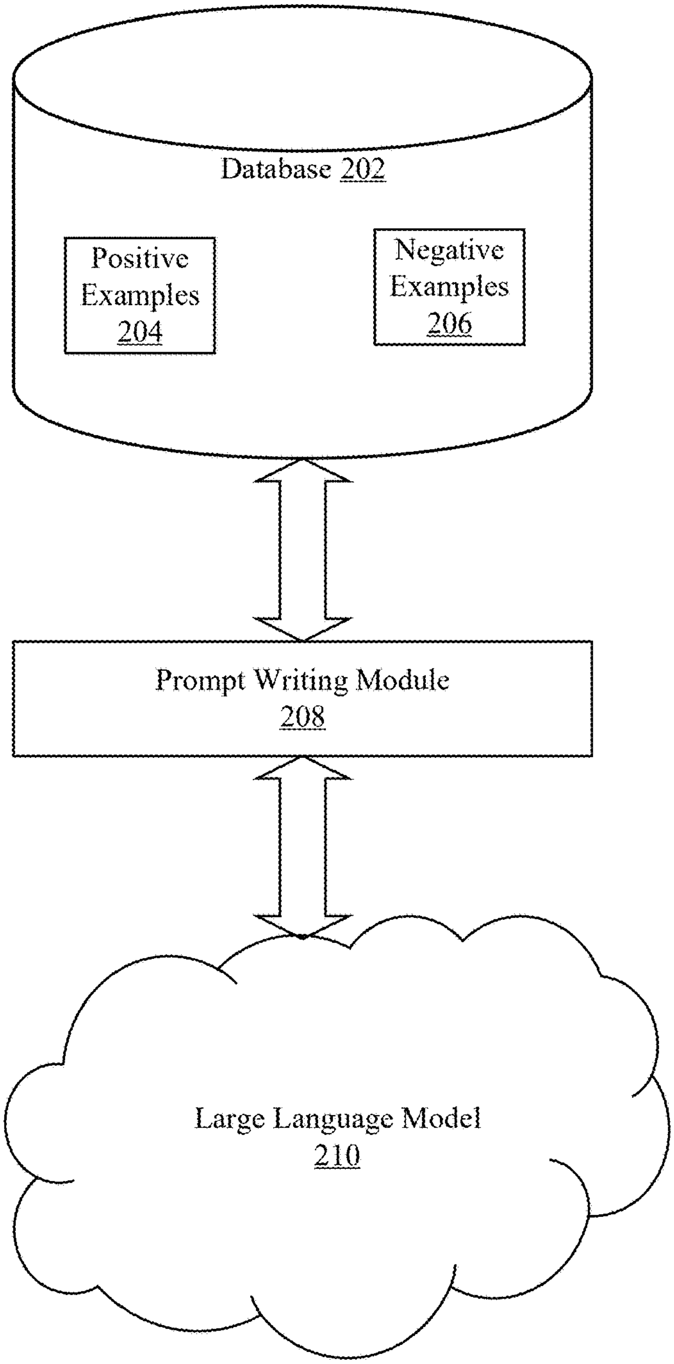
FIG. 2 shows an example architecture for contrastive in-context learning for large language models, based on the principles disclosed herein.

FIG. 2 shows an example architecture 200 for contrastive in-context learning for large language models, based on the principles disclosed herein. It should be understood that the components of the architecture 200 shown in FIG. 2 and described herein are examples and should not be considered limiting. Architectures with additional, alternative, or fewer number of components should be considered within the scope of this disclosure.

Within the illustrated architecture 200, a database 202 (which may be any one of the first database 124 and the second database 134 shown in FIG. 1) stores positive examples 204 and negative examples 206. The positive examples 204 include desired responses/answers and corresponding questions for a large language model 210. The positive examples 204 are labeled to indicate that the positive examples 204 form a desired behavior of the large language model 210. The negative examples 206 include non-desired responses/answers and corresponding questions for the large language model 210. The negative examples 206 are labeled to indicate that the negative examples 206 form a non-desired behavior of the large language model 210.

A prompt writing module 208 retrieves the positive examples 204 and the negative examples 206 and provides them as prompts to the large language model 210. That is, the prompt writing module 208 outputs to the large language model 210 questions and desired answers to the questions along with non-desired answers. Usage of both positive examples 204 and negative examples 206 forms a contrastive in-context learning protocol in accordance with the disclosed principles. In one or more embodiments, the prompt writing module 208 may follow a reason-before-answer technique such that the large language model 210 analyzes the good answers (positive examples 204) and bad answers (negative examples 206). The use of the reasoning step in the protocol provides the large language model 210 with more clues to generate a better, desired answer to a corresponding prompt.

The large language model 210 can include any kind of large language model, including but not limited to GPT-4 (OpenAIR), ChatGPT (OpenAIR), PaLM (Google®), LLaMa (Meta®), BLOOM, Ernie 3.0 Titan, and/or Claude, to name a few. Embodiments disclosed herein are directed to improving the output of the large language model 210 through the use of the disclosed contrastive in-context learning protocol such that the responses to the prompts are based on user-preferences.

Figure 3:
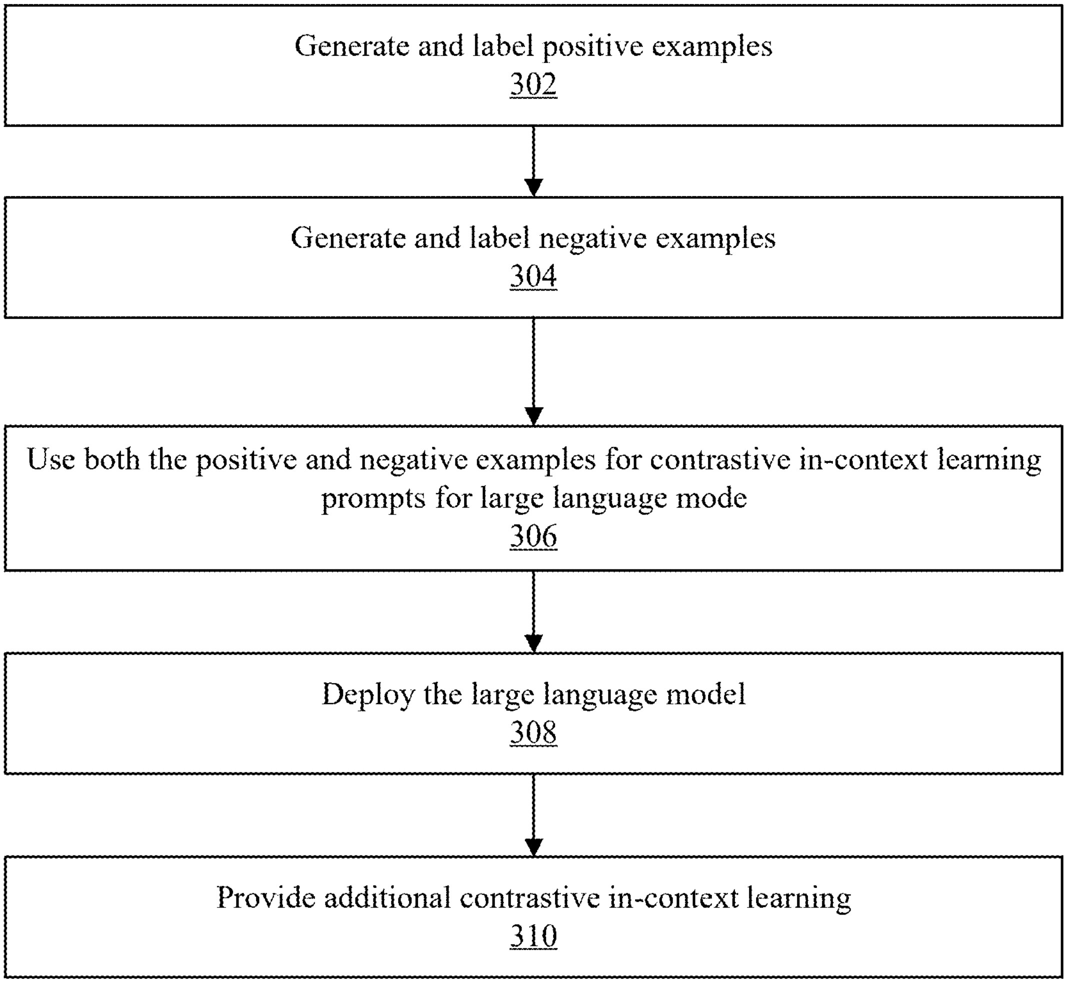
FIG. 3 shows a flow diagram of an example method of contrastive in-context learning for large language models, based on the principles disclosed herein.

FIG. 3 shows a flow diagram of an example method 300 of contrastive in-context learning for large language models, based on the principles disclosed herein. It should, however, be understood that the steps of the method 300 are provided as examples and should not be considered limiting. Therefore, methods with alternative, additional, or fewer number of steps should be considered within the scope of this disclosure. The steps of the method 300 may be performed by any combination of components of the system 100 shown in FIG. 1 and/or components of the architecture 200 shown in FIG. 2.

The method begins at step 302 where positive examples are generated and labeled. The positive examples can be generated and labeled manually in one embodiment. For example, the positive examples may include a collection of e-mails with a desired tone and style. That is, the positive examples can be human written for the language models to mimic a certain style or learn from a human-written corpus. Therefore, embodiments disclosed herein are not confined to just machine generated positive examples. As another example, positive examples may include a collection of chatbot responses having desired lengths and details. The positive examples may therefore include any kind of text suitable for the large language models. Generally, the positive examples include the desired style, length, level of details, and/or other attributes that a large language model is to adhere to when generating a response. The labeling of the positive examples may include, for example, "good answer," "desired answer," "good response," "desired response," or the like. In one or more embodiments, the answers in the positive examples have received high ratings from the users.

At step 304, negative examples are generated and labeled. As with the positive examples, the negative examples can be generated and labeled manually in one or more embodiments. In one or more embodiments, negative examples may include a collection of emails of non-desired tone and style. Or, the negative examples may include of collection of chatbot response that are of non-desired lengths and details. Generally, the negative examples may include any kind of text suitable for the large language models. In contrast to the positive examples, negative examples include style, length, level of details and/or other attributes that the large language model should not adhere to when generating a response. The labeling of the negative examples may include, for example, "bad answer," "non-desired answer," "bad response," "non-desired response," or the like. In one or more embodiments, the answers in the negative examples have received low ratings from the users.

In one or more embodiments, the negative examples can be generated from either labeled data (e.g., when a user or annotator explicitly/implicitly labels a response as not preferred/desired) or can be generated using positive example inputs. That is, the positive example inputs can be used to generate negative examples that are different from the positive example inputs. For example a positive example input can include words connoting positive, uplifting meaning and the negative examples can be generated replacing those words with words connoting negative, downgrading meaning. Therefore, embodiments disclosed herein are not limited to being applied on a corpus of already prepared negative examples, but can generate additional examples from a base of a few examples.

At step 306, both positive and negative examples may be used for contrastive in-context learning prompts for the large language model. For example, a prompt writing module (e.g., prompt writing module 208 shown in FIG. 2) may feed both positive and negative examples to the large language model as a part of a contrastive in-context learning protocol.

In one or more embodiments, the positive and negative examples may be input into the large language model without instructing the large language model to analyze the positive and negative examples. The large language model generally identifies the desired attributes of the positive examples and also identifies the non-desired attributes of the negative examples. The large language model, however, may not be instructed to perform an analysis of why the positive example is positive and why the negative example is negative.

In one or more embodiments, the positive and negative examples may be input into the large language model while instructing the large language model to analyze the positive and negative examples. In addition to identifying the desired attributes of the positive examples and the non-desired attributes of the negative examples, the large language model may generate—and therefore learn—the reason why the positive examples are positive and why the negative examples are negative. Instructing the large language model to perform such analysis may typically enhance the responses of the large language model.

At step 308, the large language model is deployed. The deployment may be on any type of application. One example deployment may be on Chatbots/AI agents, which interact with a plurality of users with similar questions/issues. Positive and negative experiences of the users can be used as the positive and negative examples, respectively, in the above steps 302, 304. The deployed large language model may therefore generate responses that will likely lead to a positive experience for the user.

Another example deployment may be used for generating e-mails in response to e-mail queries. To train the model for such deployment, good and bad e-mails (e.g., based on clickthrough rates) may be used as positive and negative examples, respectively, and the model can determine what makes the e-mails good or bad. During the deployment, such determination/reasoning may help the model to generate good (e.g., with preferred length and style) e-mails.

Another example deployment may be used for generating text for various purposes. For example, the language learning model may be deployed for generating text for advertisements, blog posts, articles, and/or the like. To train the model for this deployment, good and bad text (e.g., as characterized by readers or experts) may be used as positive and negative examples, respectively, and the model can reason what makes the text good or bad. During the deployment, such reasoning may help the model generate good (e.g., with preferred length and style) text. It should be understood that these are just example deployments and should not be considered limiting. Any other types of deployments should be considered within the scope of this disclosure.

At step 310, additional contrastive in-context learning is provided. In one or more embodiments, the additional learning may be based on feedback during the deployment of step 308. For example, feedback may be collected for responses generated by a Chatbot agent, e.g., a user may be prompted to "like" or "dislike" generated responses (and/or provide a high or low rating thereto) and these tagged responses can be used as positive and negative examples for the additional contrastive in-context learning. Similarly, recipients of the generated e-mails can be prompted to "like" or "dislike" the e-mails (and/or provide high or low rating thereto) and these tagged e-mails too can be used for additional in-context learning. Generally, any kind of feedback mechanism that provides additional learning opportunities should be considered within the scope of this disclosure.

Figure 4A:
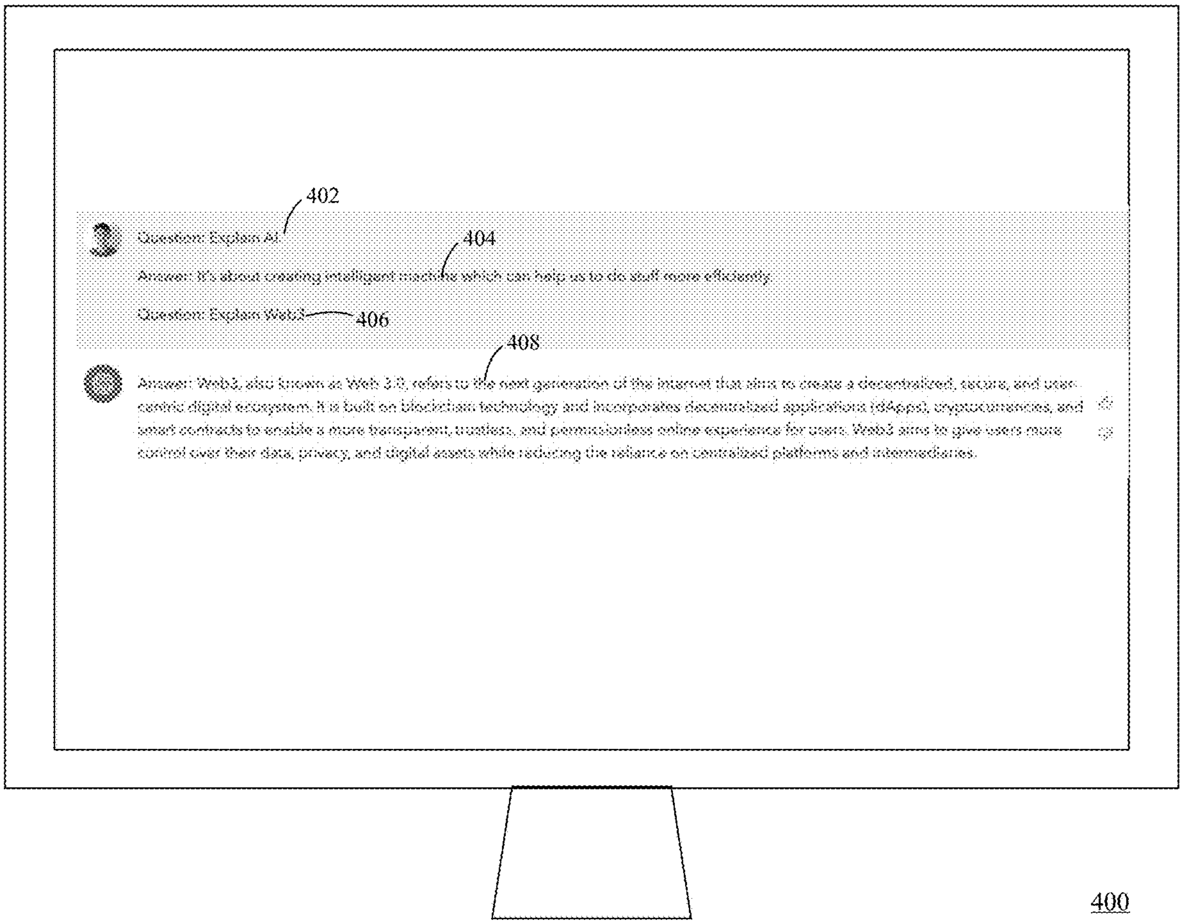
FIG. 4A shows an example graphical user interface (GUI) displaying prompts and responses based on conventional technology.

FIG. 4A shows an example graphical user interface (GUI) 400 displaying prompts and responses based on conventional technology. As shown, the GUI 400 has a first question 402 that a large language model uses to generate a first response 404. The first response 404 is concise, as desired. This contrasts with a second response 408 in response to a second question 406. Unlike the first response 404, the second response 408 is verbose, which is undesirable.

Figure 4B:
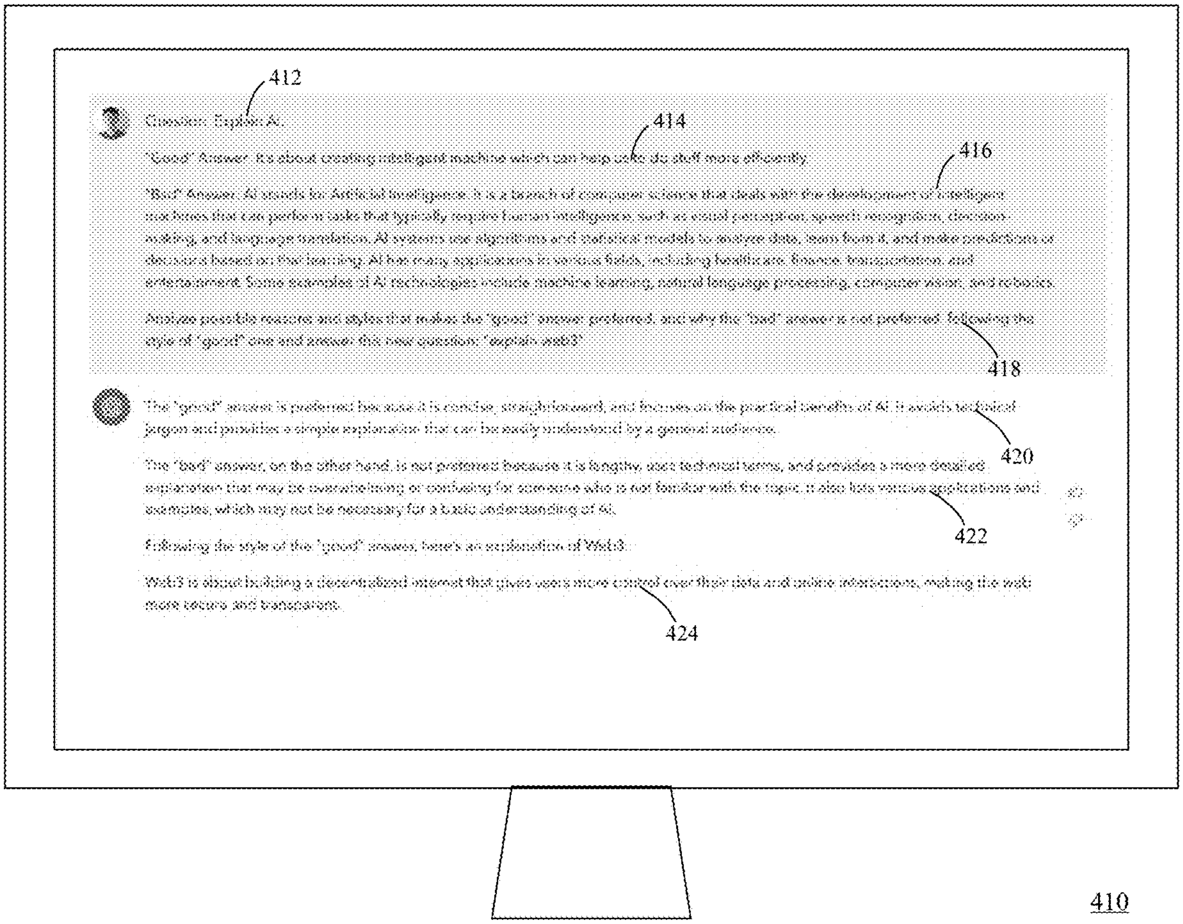
FIG. 4B shows an example GUI displaying prompts and responses based on the principles disclosed herein.

FIG. 4B shows an example GUI 410 displaying prompts and responses based on the principles disclosed herein. The GUI 410 is just but an example shown to an admin user during an implementation of the contrastive in-context learning protocol. It should, however, be understood that the GUI 410 is not a requirement. That is, a prompt writing module (e.g., prompt writing module 208 shown in FIG. 2) can automatically provide the positive and negative examples at the background without these examples being shown. The GUI 410 is therefore just intended to illustrate the principle. As shown, the large language model is provided with a question 412 ("Explain AI"), a good answer (i.e., a positive example) 414, and a bad answer (i.e., a negative example) 416. Additionally, an instruction 418 is provided to the large language model to analyze possible reasons and styles that makes the good answer is preferred and why the bad answer is not preferred and also a second prompt ("explain web3").

In response, the large language model provides a first analysis 420 for the good answer 414 and a second analysis 422 for the bad answer 416. Based on the first and second analyses 420, 422, the large language model generates an answer 424 for the second question. As shown, the answer 424 is concise and provides a simple explanation that is easily understood by a general audience.

Additionally, the inventors performed experiments to compare the outputs generated by large language models with contrastive in-context learning compared to the baseline of large language models without the contrastive in-context learning and an upper bound of feeding the correct/desired answer to the model. Tables I, II, III, and IV below show the experimental results.

Particularly, tables I, II, III, and IV show an embedding similarity between a desired answer (or response) and the answer generated by the large language model. A higher embedding similarity means that the generated answer is closer to the desired answer. As shown, baseline zero-shot refers to directly asking the large language model to answer a question without any in-context learning. For in-context learning, one shot refers to providing one good example to the large language model before asking a new question, and two shots refers providing two good examples to the large language model before asking the new question. One shot contrastive refers to providing one bad (negative) example beside one good (positive) example. The bad example can be a low-rated response from a user or a deliberately engineered bad example, which may not need user rating. One shot, contrastive, reasoning refers to, in addition to providing good and bad examples, instructing the large language model to analyze the good and bad examples and then use the learned reasoning to find good answers. Oracles are upper-bounds of the embedding similarities where the correct/desired answers are fed in response to a current question to the large language model.

All of the tables I, II, III, and IV pertain to cooking related text. Particularly, table I pertains to measuring similarities between top rated answers and generated answers for cooking related real information; table II pertains to similarities between funny answers and generated funny answers for cooking related fake information, table III pertains to similarities between concise answers and generated concise answers for cooking related fake information, and table IV pertains to similarities between British/American answers and generated British/American answers to cooking related fake information. As can be seen in all of the tables I, II, III, and IV below, the contrastive learning quickly approaches the upper bound, thereby providing a significant improvement over the conventional baseline models.

TABLE I

| Cooking-Real (top rated vs. low-rated answers) | | | |
|---|---|---|---|
| | | Embedding similarity | |
| | | Negative = low-rated | Negative = generated |
| Baseline | Zero shot | 0.610 | |
| In-context learning | One shot | 0.627 | |
| | Two shots | 0.638 | |
| | One shot, contrastive | 0.646 | 0.649 |
| | One shot, contrastive, reasoning | 0.659 | 0.664 |
| Oracle (upper bound) | One shot | 0.634 | |
| | Two shot | 0.644 | |
| | Three shot | 0.666 | |

TABLE II

| Cooking-Fake (Funny vs. Serious) | | | |
|---|---|---|---|
| | | Embedding similarity | |
| | | Negative = low-rated | Negative = generated |
| Baseline | Zero shot | 0.604 | |
| In-context learning | One shot | 0.613 | |
| | Two shots | 0.610 | |
| | One shot, contrastive | 0.608 | 0.599 |
| | One shot, contrastive, reasoning | 0.638 | 0.630 |
| Oracle (upper bound) | One shot | 0.607 | |
| | Two shot | 0.623 | |
| | Three shot | 0.623 | |

TABLE III

| Cooking-Fake (Concise vs. Detailed) | | | |
|---|---|---|---|
| | | Embedding similarity | |
| | | Negative = low-rated | Negative = generated |
| Baseline | Zero shot | 0.826 | |
| In-context learning | One shot | 0.829 | |
| | Two shots | 0.834 | |
| | One shot, contrastive | 0.850 | 0.856 |
| | One shot, contrastive, reasoning | 0.873 | 0.883 |

TABLE III-continued

| Cooking-Fake (Concise vs. Detailed) | | | |
|---|---|---|---|
| | | Embedding similarity | |
| | | Negative = low-rated | Negative = generated |
| Oracle (upper bound) | One shot | 0.819 | |
| | Two shot | 0.911 | |
| | Three shot | 0.939 | |

TABLE IV

| Cooking-Fake (British vs. American) | | | |
|---|---|---|---|
| | | Embedding similarity | |
| | | Negative = low-rated | Negative = generated |
| Baseline | Zero shot | 0.783 | |
| In-context learning | One shot | 0.807 | |
| | Two shots | 0.806 | |
| | One shot, contrastive | 0.825 | 0.818 |
| | One shot, contrastive, reasoning | 0.830 | 0.827 |
| Oracle (upper bound) | One shot | 0.813 | |
| | Two shot | 0.831 | |
| | Three shot | 0.857 | |

Figure 5:
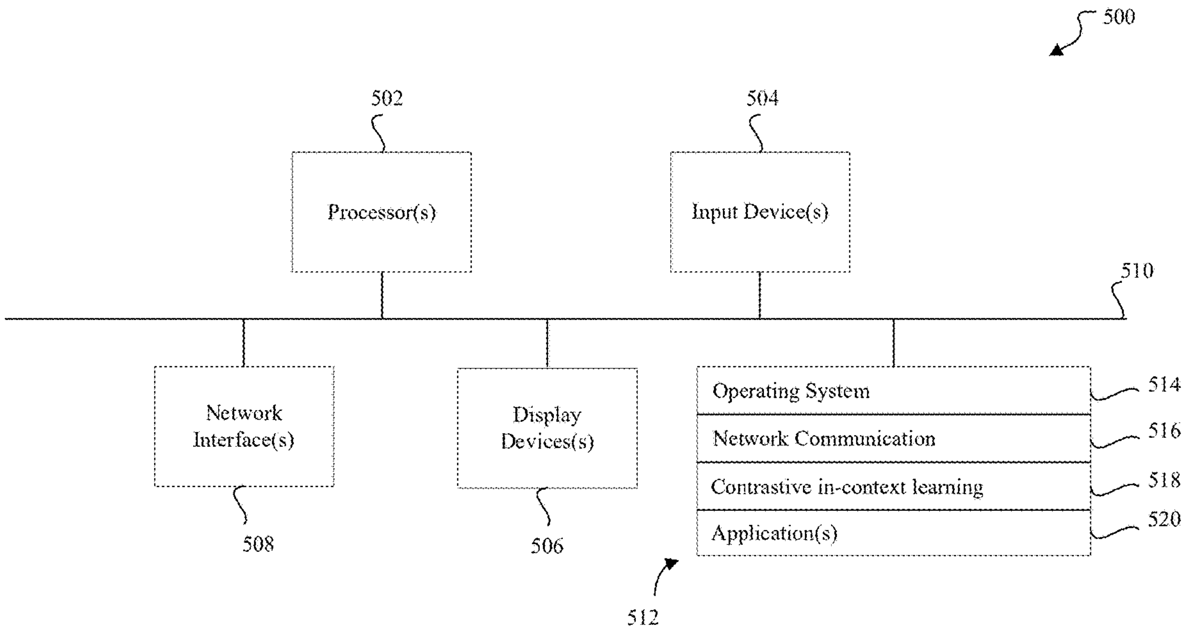
FIG. 5 shows a block diagram of an example computing device that implements various features and processes based on the principles disclosed herein.

FIG. 5 shows a block diagram of an example computing device 500 that implements various features and processes based on the principles disclosed herein. For example, computing device 500 may function as first server 120, second server 130, client 150*a*, client 150*b*, or a portion or combination thereof in some embodiments. The computing device 500 may function as one or more portions of the architecture 200 and may perform one or more steps of the method 300. The computing device 500 may also display the GUI 410. The computing device 500 is implemented on any electronic device that runs software applications derived from compiled instructions, including without limitation personal computers, servers, smart phones, media players, electronic tablets, game consoles, email devices, etc. In one or more embodiments, the computing device 500 includes one or more processors 502, one or more input devices 504, one or more display devices 506, one or more network interfaces 508, and one or more computer-readable media 512. Each of these components is be coupled by a bus 510.

Display device 506 includes any display technology, including but not limited to display devices using Liquid Crystal Display (LCD) or Light Emitting Diode (LED) technology. Processor(s) 502 uses any processor technology, including but not limited to graphics processors and multi-core processors. Input device 504 includes any known input device technology, including but not limited to a keyboard (including a virtual keyboard), mouse, track ball, and touch-sensitive pad or display. Bus 510 includes any internal or external bus technology, including but not limited to ISA, EISA, PCI, PCI Express, USB, Serial ATA or FireWire. Computer-readable medium 512 includes any non-transitory computer readable medium that provides instructions to processor(s) 502 for execution, including without limitation, non-volatile storage media (e.g., optical disks, magnetic disks, flash drives, etc.), or volatile media (e.g., SDRAM, ROM, etc.).

Computer-readable medium 512 includes various instructions 514 for implementing an operating system (e.g., Mac OS®, Windows®, Linux). The operating system may be multi-user, multiprocessing, multitasking, multithreading, real-time, and the like. The operating system performs basic tasks, including but not limited to: recognizing input from input device 504; sending output to display device 506; keeping track of files and directories on computer-readable medium 512; controlling peripheral devices (e.g., disk drives, printers, etc.) which can be controlled directly or through an I/O controller; and managing traffic on bus 510. Network communications instructions 516 establish and maintain network connections (e.g., software for implementing communication protocols, such as TCP/IP, HTTP, Ethernet, telephony, etc.).

Contrastive in-context learning module 518 includes instructions that implement the disclosed embodiments for contrastive customizing and personalizing the large language models.

Application(s) 520 may comprise an application that uses or implements the processes described herein and/or other processes. The processes may also be implemented in the operating system.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment. In one embodiment, this may include Python. The computer programs therefore are polyglots.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random-access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112 (f). Claims that do not expressly include the phrase "means for" or "step for" are not to be interpreted under 35 U.S.C. 112 (f).

What is claimed is:

1. A computer-implemented method of performing contrastive in-context learning on a large language model, said method comprising:

inputting into the large language model a question associated with a contrastive in-context learning protocol for the large language model, the contrastive in-context learning protocol being based on a user preference;

inputting into the large language model a first answer for the question, the first answer forming a positive example of the contrastive in-context learning protocol;

instructing the large language model to analyze why the first answer forms the positive example;

inputting into the large language model a second answer for the question, the second answer forming a negative example of the contrastive in-context learning protocol;

instructing the large language model to analyze why the second answer forms the negative example;

generating by the large language model an output describing why the first answer forms the positive example and why the second answer forms the negative example as a part of the contrastive in-context learning protocol;

deploying the large language model, after the contrastive in-context learning, to generate additional answers based on the user preference and the output describing why the first answer forms the positive example and why the second answer forms the negative example and responsive to receiving additional questions.

2. The computer-implemented method of claim 1, further comprising:

generating the positive example responsive to the user providing a high rating to the first answer.

3. The computer-implemented method of claim 1, further comprising:

generating the negative example responsive to the user providing a low rating to the second answer.

4. The computer-implemented method of claim 1, further comprising:

performing an additional contrastive in-context learning on the large language model by inputting a first subset of additional answers with high ratings as additional positive examples and a second subset of additional answers with low ratings as additional negative examples.

5. The computer-implemented method of claim 1, the deploying the large language model comprising:

deploying the large language model as a chatbot agent.

6. The computer-implemented method of claim 1, the deploying the large language model comprising:

deploying the large language model as an e-mail generator.

7. The computer-implemented method of claim 1, the deploying the large language model comprising:

deploying the large language model as a text generator.

8. The computer-implemented method of claim 1, the user preference being associated with a length of answers, the inputting of the first answer and the second answer comprising:

inputting to the large language model the first answer of a first length; and inputting to the large language model the second answer of a second length, the first length being shorter than the second length.

9. The computer-implemented method of claim 1, the user preference being associated with a style of answers, the inputting of the first answer and the second answer comprising:

inputting to the large language model the first answer of a first style preferred by the user; and inputting to the large language model the second answer of a second style not preferred by the user.

10. A system to perform contrastive in-context learning on a large language model, comprising:

a non-transitory storage medium storing computer program instructions; and a processor configured to execute the computer program instructions to cause operations comprising:

inputting to the large language model a question associated with a contrastive in-context learning protocol for the large language model, the contrastive in-context learning protocol being based on a user preference;

inputting to the large language model a first answer for the question, the first answer forming a positive example of the contrastive in-context learning protocol;

instructing the large language model to analyze why the first answer forms the positive example;

inputting to the large language model a second answer for the question, the second answer forming a negative example of the contrastive in-context learning protocol;

instructing the large language model to analyze why the second answer forms the negative example;

generating by the large language model an output describing why the first answer forms the positive example and why the second answer forms the negative example as a part of the contrastive in-context learning protocol;

after the contrastive in-context learning, deploying the large language model to generate additional answers based on the user preference and the output describing why the first answer forms the positive example and why the second answer forms the negative example responsive to receiving additional questions.

11. The system of claim 10, the operations further comprising:

generating the positive example responsive to the user providing a high rating to the first answer.

12. The system of claim 10, the operations further comprising:

generating the negative example responsive to the user providing a low rating to the second answer.

13. The system of claim 10, the operations further comprising:

performing an additional contrastive in-context learning on the large language model by inputting a first subset of additional answers with high ratings as additional positive examples and a second subset of additional answers with low ratings as additional negative examples.

14. The system of claim 10, the deploying the large language model comprising:

deploying the large language model as a chatbot agent.

15. The system of claim 10, the deploying the large language model comprising:

deploying the large language model as an e-mail generator.

16. The system of claim 10, the deploying the large language model comprising:

deploying the large language model as a text generator.

17. The system of claim 10, the user preference being associated with a length of answers, the inputting of the first answer and the second answer comprising:

inputting to the large language model the first answer of a first length; and inputting to the large language model the second answer of a second length, the first length being shorter than the second length.

18. The system of claim 10, the user preference being associated with a style of answers, the inputting of the first answer and the second answer comprising:

inputting to the large language model the first answer of a first style preferred by the user; and inputting to the large language model the second answer of a second style not preferred by the user.

* * * * *